No. 894,431.
PATENTED JULY 28, 1908.
E. A. & C. A. GARVEY.
SHOCK ABSORBER FOR VEHICLES.
APPLICATION FILED SEPT. 23, 1907.
2 SHEETS—SHEET 1.
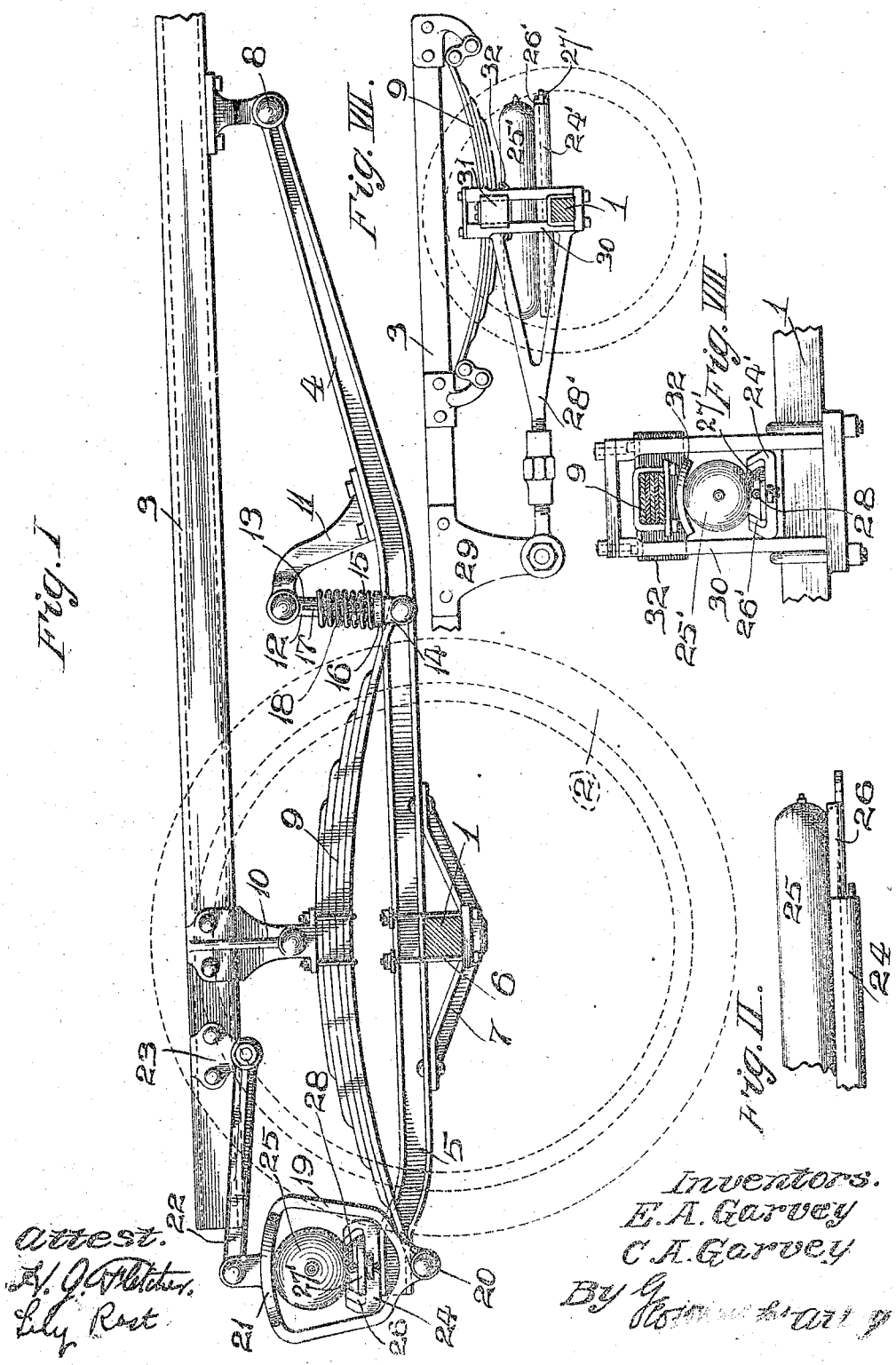
Inventors:
E. A. Garvey
C. A. Garvey

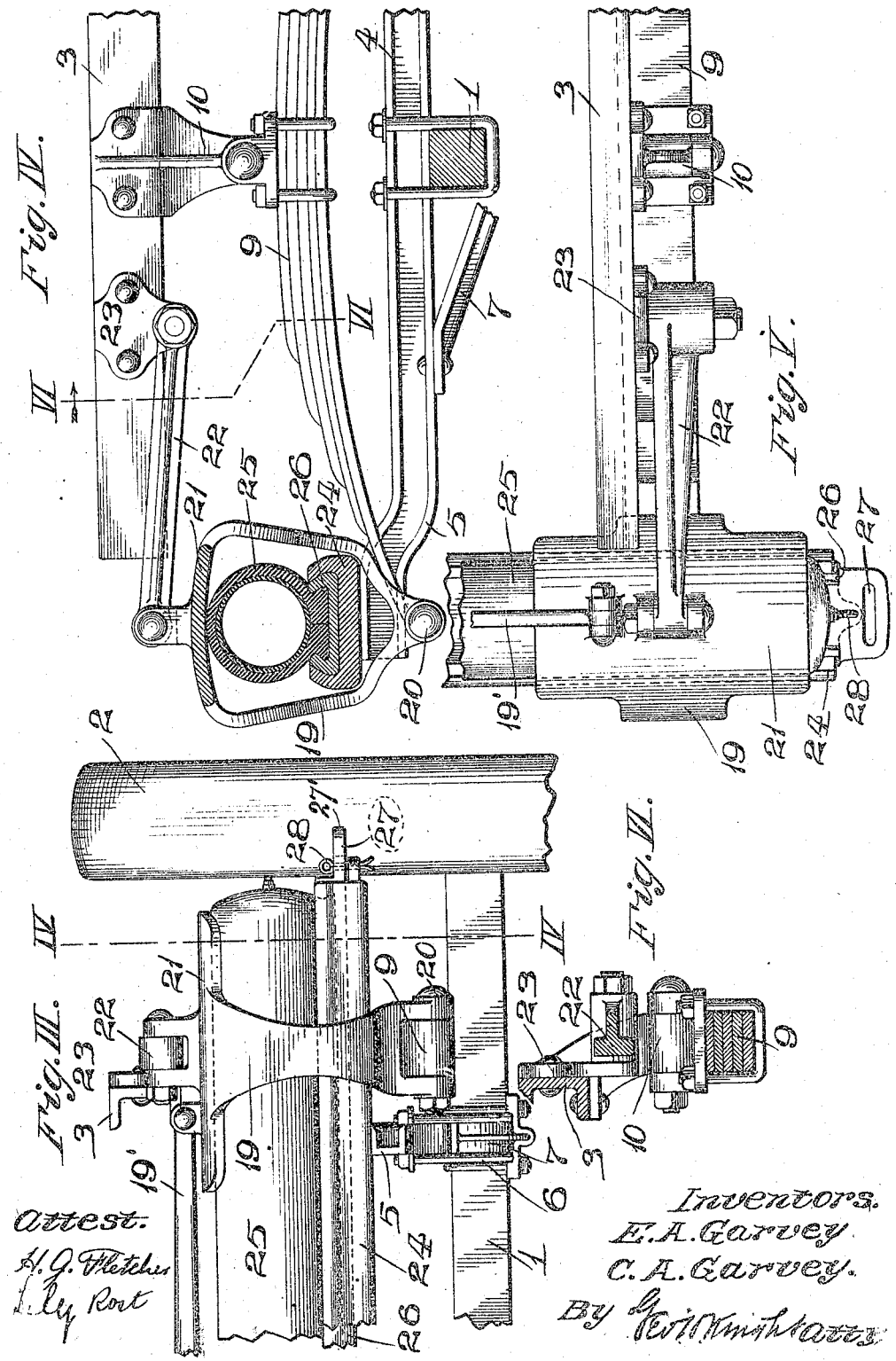

UNITED STATES PATENT OFFICE.

EDWARD A. GARVEY AND CHRISTOPHER A. GARVEY, OF ST. LOUIS, MISSOURI.

SHOCK-ABSORBER FOR VEHICLES.

No. 894,431.　　　　　Specification of Letters Patent.　　　　　Patented July 28, 1908.

Application filed September 23, 1907. Serial No. 394,136.

*To all whom it may concern:*

Be it known that we, EDWARD A. GARVEY and CHRISTOPHER A. GARVEY, citizens of the United States of America, residing in the city of St. Louis and State of Missouri, have invented certain new and useful Improvements in Shock-Absorbers for Vehicles, of which the following is a full, clear, and exact description, reference being had to the accompanying drawings, forming part of this specification.

Our invention relates to means in a vehicle for absorbing the shocks to which the vehicle is subjected during its use and the invention has for its object to provide improved means whereby such shocks may be satisfactorily taken care of aside from the wheels of the vehicle, thereby, if desired, dispensing with the use of inflated or other cushion tires upon the wheels that are extremely liable to injury while traveling upon roadways.

Figure I is an elevation of parts of a motor vehicle in which our improvements are illustrated. Fig. II is an elevation of the pneumatic bolster and its carrier, the bolster and holder therefor being shown partly withdrawn from the carrier. Fig. III is an enlarged front or rear elevation of the bolster and the parts of the vehicle with which the bolster is associated. Fig. IV is a vertical section taken on line IV—IV, Fig. III. Fig. V is a top or plan view of the parts shown in Fig. III. Fig. VI is a vertical cross section taken on line VI—VI, Fig. IV. Fig. VII is a side elevation illustrating a modification. Fig. VIII is a front or rear elevation of the device illustrated in Fig. VII.

1 designates an axle of a motor vehicle and 2 one of the ground wheels fitted to said axle. 3 is the body frame of the vehicle and 4 is one of the radial arms secured to the axle 1 by a suitable clip 6 and a brace 7 pivotally connected to the body frame at 8. Each radial arm is provided with an extension 5 that extends outwardly beyond the axle of the vehicle at either the front or rear of such vehicle to serve as a support for parts to be hereinafter described.

9 is one of the main springs preferably of semi-elliptical type which is centrally connected to the body frame 3 by a shackle 10. The inner end of the spring 9 is yieldingly connected to the radial arm 4 by the following parts: 11 is a bracket arm secured to the radial arm and to the upper end of which is pivoted a depending hollow and tubular guide rod 12 containing a vertical slot 13. 14 is a clip pivoted to the inner arm of the spring and provided with a vertically extending rod 15 that passes through a spring seat arm 16 projecting from the radial arm 4 and is loosely seated in the guide rod 12. The rod 15 is provided at its upper end with a head 17 which is adapted to operate in the slot in the rod 12. 18 is a cushion spring that rests upon the spring seat arm 16 and which receives the head at the upper end of the rod 15.

19 designates a saddle that is pivoted at 20 to the outer end of the machine spring 9 and which is provided at its upper end with a shoe 21. This saddle is retained in an approximately upright position by a controller link 22 pivotally connected to the saddle and to a bracket 23 carried by the body frame 3 of the vehicle which serves to permit vertical movement of the saddle in the use of the vehicle.

24 designates a carrier preferably of channel shape that is mounted upon the extensions 5 of the radial arms 4, of which arms there are two at each end of the vehicle. This carrier extends transversely of the vehicle and terminates at each end above a main spring 9 and within the saddles 19 connected to the main springs at the sides of the vehicle.

25 designates an elongated pneumatic bolster that is of sufficient length to extend transversely entirely across the vehicle beyond the body frame from one of the saddles 19 to the saddle at the other side of the vehicle and on which the shoes of the saddles are adapted to rest so as to receive the weight of the vehicle body at both sides of said vehicle body. This bolster preferably comprises an inner inflatable tube and an outer casing, the latter of which may be flanged at the bottom and is split to permit the introduction of the inner tube.

26 is a holder preferably of channel shape in which the bolster is clamped and which is detachably fitted to the carrier 24 to be supported by said carrier in a position to cause the bolster in said holder to extend transversely across the vehicle and have its end portions inclosed within the saddles 19 so as to permit of the shoes of said saddles resting upon the tops of said end portions. The bolster holder is detachably mounted in the carrier 24 to permit of its being withdrawn from the carrier in the event of the bolster secured to the holder becoming injured in service, or becoming in any other way unfit for further use. We thus provide for the separation of a bolster from the vehicle and the introduction of another bolster fitted to a holder being inserted into the carrier 24 to take the place of the one previously in use and this operation of replacing one bolster by another is easily and speedily accomplished. The bolster may be secured to the holder by clenching it therein in a manner common to that in which pneumatic tires are commonly secured to vehicle wheels or in any other suitable manner. We provide, in one end of the bolster holder, which preferably extends beyond an end of the carrier 24, a hand-hole 27, see Fig. V, in order that the holder may be readily grasped in inserting and withdrawing it from the carrier 24 and we also preferably provide key holes in the carrier and holder adapted to receive a key 28, that serves to retain the bolster holder within the carrier when it is in place therein.

The herein described construction of a bolster carrier and bolster holder in which the latter is detachably fitted to the former so that it may be readily inserted and withdrawn therefrom, as illustrated in Fig. II, is a most important one in that it provides for the substitution of one bolster for another with ease and speed, thereby avoiding the irksome and tedious operation of replacing pneumatic tires upon motor vehicle wheels, which tires are, in accordance with our improvements, intended to be supplanted by the bolsters herein described.

In the practical use of our shock absorber the force of a blow upon a ground wheel of the vehicle is transmitted from the wheel to the axle mounted therein from said axle to the radial bar 4 and its extension 5 and the bolster carrier mounted upon a pair of radial arm extensions. This shock is then taken care of by the pneumatic bolster so that it is not forcibly transferred to the body of the vehicle, this being due to the body of the vehicle being supported upon the bolster through the medium of the spring 9 and the saddle 19 connected to said spring and resting upon the bolster.

It is to be understood that there is a bolster 25 at each end of the vehicle, a pair of the main springs 9 at each end of the vehicle, at the sides thereof and four of the saddles 19 associated with the springs and supported by the bolsters. The saddles 19 are connected by bridge pieces 19', see Figs. III and V, at each end of the vehicle which serve as stays between these saddles, and the bridge pieces are preferably pivoted to the saddles in order that the saddles may play at each side of the vehicle to a limited degree in the event of one or the other of them at the end of the vehicle being acted upon more forcibly than the mating saddle.

In Figs. VII and VIII we have shown a modification in which the bolster carriers 24' are mounted upon the axle of a vehicle to extend transversely of said axle beneath the main springs 9 that are attached to the body frame 3. The carrier 24' supports the bolster holder 26' in a manner similar to that previously described and the bolster 25' is suitably secured to said bolster. 28' is a radial arm pivoted to a bracket 29 carried by the body frame 3 and which extends into proximity with the axle on which the bolster carriers 24' are mounted. This arm is provided with a pair of vertical guides 30 located at the sides of the axle and adapted to move vertically with the arm. 31 is a saddle block securely fitted to the spring 9 and confined between the guides of the radial arm 28' and provided with a shoe 32 which rests upon the bolster 25'. It will be seen that this construction provides for the movement of the saddle block in a manner to permit the cushioning action of the pneumatic bolster in order that shocks will not be communicated from the ground wheels of the vehicle to the body of such vehicle.

We claim:

1. The combination, with a vehicle having a body frame, an axle, and a radial arm pivoted to said body frame and supported by said axle; of a saddle supported by said radial arm, a carrier supported by said arm, a pneumatic bolster mounted upon said carrier and a main spring connected with said radial arm and said saddle and yieldably supported by said bolster, substantially as set forth.

2. The combination, with a vehicle having a body frame, an axle, and radial arms pivoted to said body frame, supported by said axle, and provided with extensions projecting beyond said axle; of a carrier mounted upon said extensions and having its ends projecting beyond said body frame, a pneumatic bolster supported by said carrier and having its ends projecting beyond said body frame, and means located outside of said body frame and having connection with said body frame and with said radial arms, yieldably supported upon the projecting ends of said bolster, substantially as set forth.

3. The combination, with a vehicle having a body frame and running gear; of a pneumatic bolster supported by said running gear, a saddle supported upon said bolster, a main spring pivotally connected intermediate of its ends to said body frame and having connection at one end with said saddle and means whereby the other end of said spring is yieldably connected to the running gear of the vehicle; substantially as set forth.

4. The combination with a vehicle having a running gear and body frame, of a pneumatic bolster supported by said running gear, a shoe resting on said bolster, a main spring pivotally connected intermediate of its ends to said body frame and having connection at one end with said shoe, and means whereby the other end of said spring is yieldably connected to the running gear of the vehicle, substantially as set forth.

5. The combination with a vehicle having a running gear and body frame, of a pneumatic bolster supported by said running gear, a saddle having a shoe resting on said bolster, a main spring connected to said running gear and body frame and having connection with the lower end of said saddle, and a restraining link by which the upper end of said saddle is pivotally connected to said body frame, substantially as set forth.

6. The combination with a vehicle having a running gear and body frame, of a pneumatic bolster supported by said running gear, shoes at the sides of the running gear adapted to rest upon said bolster, a bridge piece connecting said shoes and means whereby said shoes are connected to said running gear and body frame, substantially as set forth.

7. The combination with a vehicle having a running gear and body frame, of a pneumatic bolster supported by said running gear, shoes at the sides of the running gear adapted to rest upon said bolster, a bridge piece pivotally connecting said shoes and means whereby said shoes are connected to said running gear and body frame, substantially as set forth.

EDWARD A. GARVEY.
CHRISTOPHER A. GARVEY.

In the presence of—
LILY POST,
H. G. COOK.